United States Patent Office 3,458,517
Patented July 29, 1969

3,458,517
PYRIDYLENE AND SUBSTITUTED PHENYL-
ENE DERIVATIVES OF PHTHALOCYANINE
PIGMENTS
James D. Stepp, Holland, Mich., assignor, by mesne as-
signments to Chemetron Corporation, Chicago, Ill., a
corporation of Delaware
No Drawing. Filed Feb. 18, 1966, Ser. No. 528,656
Int. Cl. C09b 47/06
U.S. Cl. 260—270
8 Claims

ABSTRACT OF THE DISCLOSURE

Phthalocyanine pigments having resistance to floccula-
tion and crystallization are provided by introducing at
least one pyridine and one halo, sulfo or chlorosulfo sub-
stituted phenylene or a substituted or unsubstituted sul-
fonamido phenylene into a porphyrazine structure.

---

This invention relates to novel phthalocyanine colors
of improved stability. More particularly, this invention
relates to metal phthalocyanine compositions and com-
pounds which are non-flocculating and non-crystallizing
in paint and other solvent systems.

Metal phthalocyanines, and especially copper, are
known to be exceptionally stable both chemically and
physically. However, copper phthalocyanine has varying
crystal forms, two of which are used commercially. These
have been designated alpha, the unstable form and beta,
the stable configuration. The alpha form is characterized
as a "red shade" pigment, the absorbance in the green
region is more pronounced. The absorbance in the beta
or "green shade" has shifted to the red region. These
forms can be changed from one to the other at will by
various chemical and physical treatments as illustrated
by the following diagram:

```
          Beta    Dissolved in Sulfuric Acid   Alpha
Heat       ↑    ────────────────────────→      |
225°-      |         Dilute with Water         |  Contact
250° C.    |                                   ↓  organic
                                                  solvents
         Alpha     Ball Mill Dry Inorganic    Beta
                  ←────────────────────────
                          Salts
```

Both crystalline forms are desirable as pigments, thus
giving a range of shade. In commercial use, however, it
is necessary to maintain the initial crystal form. Various
methods of treating the alpha form to stabilize it have
been tried. The addition of chlorine to the molecule and
the addition of phthalocyanine mono sulfonic acid, as in
U.S. 3,024,247 leave nothing to be desired in crystal
stability.

The addition of phthalimidomethyl groups, diluting the
pigment with aluminum benzoates and blending with
phthalocyanine sulfonic acids are the subject of other
patents such as U.S. 3,024,247. All these treatments while
generally successful in maintaining crystal stability, shift
the shade of the pigment much greener with the exception
of the benzoate treatment, which is costly and adds ex-
traneous substance to the formulation.

Another problem in formulation of paints with copper
phthalocyanine is the phenomenon of flocculation. Floc-
culation is described as loose electrostatic binding of pig-
ment particles in the vehicle. This occurs quickly after
the dispersion of the pigment and causes a progressive
loss in color value. Flocculation can be broken up by
mechanical action such as that applied by spraying. How-
ever, lower degrees of work such as brushing the paint,
fail to deflocculate the pigment. Again, the methods de-
scribed above are used to prevent flocculation, and have
the same drawbacks.

It is the primary object of this invention to provide a
phthalocyanine pigment which is truly non-flocculating
and non-crystallizing. The term "non-flocculating" means
a pigment, which, on testing by the procedure in Exam-
ple II, will produce a coating that shows no difference
between the sprayed and poured portion of the test panel,
while the term "non-crystallizing" means coloring matter
which will not crystallize from a 2% dispersion in xylene
maintained at 70° C. for 24 hours, a crystallization test
employed in the pigment art.

It is an additional object to provide non-flocculating
phthalocyanine pigments without change in shade to the
green side. Another object is to provide a method of
manufacture for a non-crystallizing, non-flocculating
phthalocyanine pigments.

Phthalocyanines such as copper are manufactured com-
mercially be reacting urea, phthalic anhydride, a copper
salt, and a molybdic catalyst at temperatures of about
200° C. This yields a "crude" which usually is then given
a preliminary extraction with water or dilute acid to
give a "base."

The base, fairly pure copper phthalocyanine, must be
conditioned to pigmentary form which can be used in
decorative coatings. Various means of conditioning have
been employed, namely, acid pasting or solution in sul-
furic acid, followed by dilution with water and isolation
of the insoluble pigment; salt grinding, in which the base
is subjected to intense grinding action with hard inorganic
salts; solvent treatments, which disperse the phthalocy-
anine in organic solvents, followed by solvent removal.

It has been discovered that when a quinolinic group
of the formula

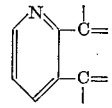

is fused into a tetraazoporphine group to form a benzaza
phthalocyanine and combined with a substituted or an
unsubstituted metal phthalocyanine, a phthalocyanine
pigment composition results which is non-flocculating and
non-crystallizing. The quinolinic group can be present in
an independent tetraazoporphine structure or in the same
tetraazoporphine molecule comprising the substituted
phthalocyanine. Mixtures of benzaza phthalocyanine,
substituted phthalocyanine, unsubstituted phthalocyanine
as well as benzaza phthalocyanine further containing sub-
stituents are employed wherein the substituted phthalic
to quinolinic group mole ratio is in the range of about
1.5–2.0 to 1. Correspondingly, the unsubstituted phthalic
to quinolinic mole ratio is in the range of about 5–30 to 1.
When the quinolinic group is fused into a tetraazopor-
phine group to form an otherwise unsubstituted phthal-
ocyanine and this benzaza phthalocyanine is combined
with a molecularly independent substituted or unsubsti-
tuted phthalocyanine the quinolinic containing phthal-
ocyanine should be in a mole percentage range of about
5–40 while the substituted or unsubstituted phthalocy-
anine will be in a range of about 95–60 mole percent.

Where the quinonlinic group is present in the same
tetraazoporphine structure with a substituted phthalic
group new compositions of matter are involved corre-
sponding to the formula:

(I)

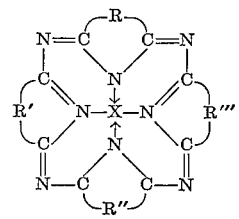

where R, R', R" and R'" independently represent pyridylene, phenylene, substituted phenylene such as halo-substituted phenylene, sulfo substituted phenylene, chlorosulfo substituted phenylene, aliphatic and aromatic substituted and unsubstituted sulfonamido substituted phenylene, X is a complex forming metal such as copper, nickel and zinc, where at least one of R, R', R" and R'" is pyridylene and at least one of the remaining R, R', R" and R'" is substituted phenylene as aforesaid and in all instances only one sulfo or chlorosulfo substituted phenylene is present. The aliphatic and aromatic substituted sulfonamido derivatives which can be employed are the mono and dilower alkyl sulfonamido such as mono and dimethyl, ethyl, propyl, isopropyl and butyl and combinations thereof. The aromatic substituted derivatives are represented by phenyl, tolyl, xylyl, and benzyl. Combinations of the aliphatic and aromatic substituted sulfonamido derivatives can also be employed.

The novel compositions of the present invention can be produced by including a minor percentage of quinolinic compound with a substituted and an unsubstituted phthalic compound in the initial reaction which includes urea, a complexing metal salt such as copper, zinc or nickel chloride and ammonium molybdate oxide catalyst. It will be recognized that any quinolinic and substituted phthalic compound which will form the indicated tetraazoporphine structure under the previously indicated conditions are operable such as quinolinic acid and substituted and unsubstituted phthalic acids as well as the anhydrides, imides, amides, diamides and esters thereof. The substituted phthalic compounds will correspond to the substituents indicated in conjunction with the phenylene substituents described in the general Formula I, the non-nuclear carbon atoms of which form a part of the tetraazoporphine structure. Similarly, the unsubstituted phthalic compounds will form the unsubstituted phenylene moiety and likewise the quinolinic compound will form a pyridylene moiety.

A preferred manner of synthesizing the compositions of the present invention is to react quinolinic acid or quinolinic anhydride with phthalic anhydride in a minor molar amount which is about 0.04 to about 0.20 and substantially less than stoichiometric so as to result in a mixture of compounds wherein the usual phthalocyanine is produced completely composed of phthalic groups while a minor amount of the mixture will be composed of quinolinic or benzaza substituted phthalocyanines as well as phthalocyanines containing substituted phthalic groups. The quinolinic and the substituted phthalic groups will be present in the mixture in the same tetraazoporphine structure as well as joined to separate phthalocyanine molecules. The novel phthalocyanines indicated in the foregoing general formula I will be present in this mixture.

An alternative to synthesizing the compositions in a mixture is to first form a copper phthalocyanine containing two phthalic acid groups and two quinolinic acid groups by mixing equimolecular portions of phthalic anhydride and quinolinic acid with urea, copper chloride and ammonium molybdate. The resulting product is then admixed with a substituted or unsubstituted phthalocyanine preferably in an acid solution.

The following examples are presented to disclose the invention more fully. It should be understood, however, that the examples are not intended to limit the invention in any way. All parts indicated in the examples are by weight.

Example I

A mixture comprising 21.2 parts of quinolinic acid, 56.2 parts of phthalic anhydride, 120 parts of urea, 12 parts of copper chloride, and 0.3 part of ammonium molybdate is heated in an electrically heated oven at 160–170° C. for two hours. After the reaction is completed it is cooled to the temperature of about 30° C., the crude pigment is boiled with a 10% sulfuric acid solution for two hours. The acid slurry is filtered, by vacuum on a Buchner funnel, the insoluble cake washed with water to remove the acid, and dried.

Sixteen parts of the resulting product and 34 parts of monochloro copper phthalocyanine are added to 220 parts of 97% sulfuric acid solution. The resulting solution is stirred and heated at 75° C. for 4 hours and then placed into 2000 parts of cold water. The pigment is isolated by filtering the slurry and washing with water to remove the residual acid and salts.

Example II

The pigment of Example I is dried, incorporated into a standard paint formulation and tested for flocculation by the following method. Two and one-half parts of the pigment, 25 parts anatase titanium dioxide and 50 parts of blown castor oil, are ground six passes on a three roll mill. Thirty-five parts of the color base so produced, 175 parts of clear nitrocellulose lacquer, and 25 parts of lacquer thinner are mixed thoroughly to produce the test lacquer. A tin coated steel panel is sprayed with two double coats of the lacquer and allowed to air dry. The remaining lacquer is allowed to stand 30 minutes and hand mixed to uniformity and then poured over a portion of the dry sprayed panel. The panel is air dried for ten minutes and then forced dried at 85° C. for twenty minutes. The strength of the sprayed coating is compared spectrophotometrically with the poured coating. The strengths of the two portions are identical. When the same test is performed using 50 parts of monochloro phthalocyanine and none of the product of Example I, the poured portion of the panel has considerably less color value.

Example III

Following the procedure outlined in Example I, 195 parts of phthalic anhydride, 43 parts of 4-chloro phthalic anhydride, 21 parts of quinolinic acid, 400 parts of urea, 43 parts of copper chloride and 1 part of molybdic oxide are charged into 100 parts of trichlorobenzene and heated to 200° C. for three hours. The crude pigment is isolated by filtering off the trichlorobenzene followed by washing with isopropyl alcohol and dilute sulfuric acid at 70° C. A mixture of copper phthalocyanine compounds results having the following structure:

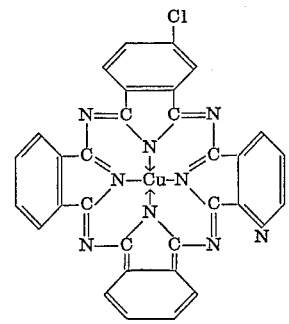

and formula $(C_6H_4)_{3.14\ av.}(C_6H_3Cl)_{0.55\ av.}(C_5NH_3)_{0.31\ av4}(CN)_8Cu$ A range of values is:

|  | Moles |
|---|---|
| Phthalic acid residue groups | 3.00–3.28 |
| Quinolinic acid residue group | 0.36–0.26 |
| Chloro phthalic residue group | 0.64–0.46 |

The product of this example when treated with sulfuric acid and acid pasted pursuant to Example I and subsequently mixed into a paint formulation as described in Example II results in a composition having comparable flocculation resistant properties.

The following example indicates a method for preparing the novel 4-chloro-phthalo monobenzaza copper phthalocyanine alone.

Example IV

Following the procedure outlined in Example I, 184 parts of phthalic anhydride, 91.25 parts of 4-chlorophthalic anhydride, 74.5 parts of quinolinic anhydride, 485 parts of urea, 52.25 parts or cuprous chloride, 1.2 parts of molybdic oxide and 1210 parts of trichlorobenzene are heated at 200° C. for three hours. The crude pigment is isolated by filtering and washing with isopropanol. The resulting solid is boiled in dilute sulfuric acid for one hour, filtered on a Buchner funnel, washed free of acid and dissolved salts and dried at 70° C. The desired 4-chloro-phthalo monobenzaza copper phthalocyanine is obtained.

Example V

Following the procedure outlined in Example I, 195 parts of phthalic anhydride, 57.5 parts of 4-sulfo phthalic acid, 21 parts of quinolinic acid, 400 parts of urea, 43 parts of cuprous chloride and one part of molybdic oxide are charged into 1000 parts of trichloro benzene and heated to 200° C. for three hours. The crude pigment is isolated by filtering on a Buchner funnel followed by washing the solids cake with isopropanol. A mixture of compounds result having the following formula:

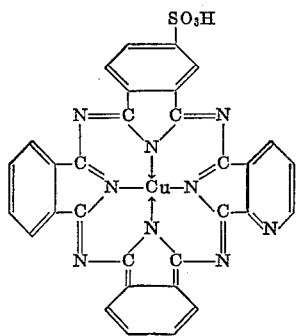

and formula

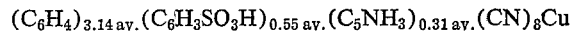

$(C_6H_4)_{3.14\,av.}(C_6H_3SO_3H)_{0.55\,av.}(C_5NH_3)_{0.31\,av.}(CN)_8Cu$

A range of values is:

| | Moles |
|---|---|
| Phthalic acid residue groups | 3.00–3.50 |
| 4-sulfo phthalic acid residue group | 0.64–0.32 |
| Quinolinic acid residue group | 0.36–0.18 |

After a dilute sulfuric acid treatment at 70° C. the product is washed freely of acid and then dried. The product is acid pasted by the method of Example I and results in a product having comparable flocculation resistant properties.

The following example indicates a method for preparing the novel 4-sulfo-phthalo monobenzaza copper phthalocyanine alone.

Example VI

Following the procedure outlined in Example I, 148 parts of phthalic anhydride, 98 parts of 4-sulfo-phthalic anhydride, 74.5 parts of quinolinic anhydride, 485 parts of urea, 52.25 parts of cuprous chloride, 1.2 parts of molybdic oxide, 1210 parts of trichlorobenzene are heated to 200° C. for three hours. The isolation and purification of the desired product is the same as indicated in Example I and the desired 4-sulfo-phthalo monobenzaza copper phthalocyanine is obtained.

Example VII

Following the procedure outlined in Example I, 195 parts of phthalic anhydride, 25.8 parts of 4-sulfo phthalic acid, 23.7 parts of 4-chloro phthalic anhydride, 21 parts of quinolinic acid, 400 parts of urea, 43 parts of copper chloride and one part of molybdic oxide are charged into 1000 parts of trichlorobenzene and treated as outlined in Example I. A mixture of compounds is recovered having the following formula:

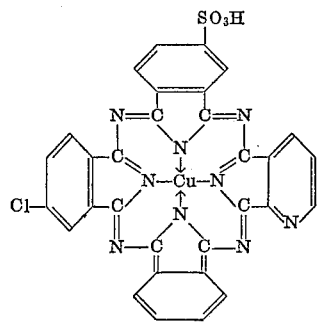

and formula

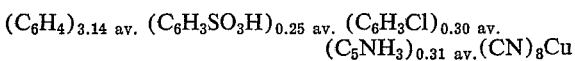

$(C_6H_4)_{3.14\,av.}(C_6H_3SO_3H)_{0.25\,av.}(C_6H_3Cl)_{0.30\,av.}(C_5NH_3)_{0.31\,av.}(CN)_8Cu$

| | Moles |
|---|---|
| Phthalic acid residue groups | 3.00–3.60 |
| 4-sulfo phthalic acid residue group | 0.29–0.12 |
| Chloro phthalic acid residue group | 0.35–0.14 |
| Quinolinic acid residue group | 0.36–0.14 |

The product of this example when treated pursuant to Example I and mixed into a standard paint formulation as outlined in Example II results in a composition having comparable flocculating resistant qualities.

The following example indicates a method for preparing the novel 4-chloro-phthalo-4-sulfo-phthalo monobenzaza copper phthalocyanine alone.

Example VIII

Following the procedure outlined in Example I, 74 parts of phthalic anhydride, 74.5 parts of quinolinic anhydride, 98.0 parts of 4-sulfo-phthalic anhydride, 91.25 parts of 4-chlorophthalic anhydride, 485 parts of urea, 52.25 parts of cuprous chloride, 1.2 parts of molybdic oxide and 1210 parts of trichlorobenzene were heated to 200° C. The desired product 4-chlorophthalo-4-sulfophthalo monobenzaza copper phthalocyanine is isolated, purified and treated as indicated in Example I.

Example IX

As outlined in Example I, 195 parts of phthalic anhydride, 57.4 parts of 4-sulfonamidophthalic acid, 21 parts of quinolinic acid, 400 parts of urea, 43 parts of cuprous chloride and one part of molybdic oxide are added to 1000 parts of trichlorobenzene and heated to 200° C. for three hours. A mixture of copper phthalocyanine compounds results having the following formula structure:

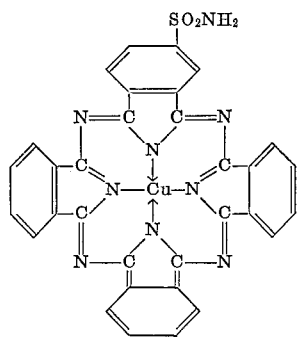

and formula

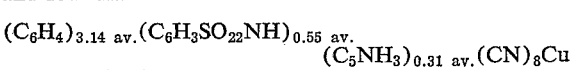

$(C_6H_4)_{3.14\,av.}(C_6H_3SO_{22}NH)_{0.55\,av.}(C_5NH_3)_{0.31\,av.}(CN)_8Cu$

A range of values is:

| | Moles |
|---|---|
| Phthalic acid residue groups | 3.00–3.50 |
| 4-sulfonamide phthalic acid residue group | 0.64–0.32 |
| Quinolinic acid residue group | 0.36–0.18 |

The product o fthis example is isolated, acid pasted and mixed into a paint formulation as described in Examples I and II resulting in a composition having comparable flocculation resistant properties.

As previously indicated, the compounds of Examples IV, VI, and VIII are useful as pigments when employed in a mixture. When employed alone these compounds have pigment properties and can be employed in standard paint and ink formulations.

Referring to all of the compounds disclosed in the examples it will be noted that certain isomeric positions are indicated for the pyridylene, phenylene and substituted phenylene groups in the tetraazoporphine structure. It will be recognized that any combination of isomeric positions are possible for these groups and the structures therein shown are representative only.

In the foregoing examples, quinolinic acid or the anhydride in addition to the mono substituted phthalic acids are reacted to produce a tetraazoporphine structure containing a pyridylene group and corresponding mono substituted phenylene groups which are fused into the tetraazoporphine structure through adjacent carbon atoms. In the manner indicated therein other mono, di or trihalo substituted phenylenes in addition to the chloro such as the bromo and the iodo can be formed by employing mono, di or tribromo or mono, di or triiodo phthalic acid. Similarly, any chlorosulfo substituted phthalic acid can be substituted for the 4-sulfo phthalic acid to yield the corresponding chloro substituted phenylene moiety in the tetraazoporphine structure. A substituted sulfonamido substituted phenylene can likewise be fused into such a structure in addition to the pyridylene moiety formed from the quinolinic acid by employing a substituted sulfonamidophthalic acid such as the mono or dialkyl and aromatic derivatives thereof. As indicated in Example VII mixtures of the various substituted phthalic acids in combination with the unsubstituted phthalic acids can be employed to yield phthalocyanines with tetraazoporphine structures composed of mixtures of the corresponding unsubstituted phenylene, substituted and pyridylene moieties resulting in compounds corresponding to the previously disclosed general Formula I. Correspondingly, tetraazoporphine structures having two or three like substituted phenylene moieties in addition to one or more pyridylene groups can also be employed with the exception of the sulfo and chlorosulfo substituted phenylene in which instances only a single such group should be condensed on the tetraazoporphine structure.

Others may readily adapt the invention for use under various conditions of service by employing one or more of the novel features disclosed or equivalents thereof.

I claim:
1. A compound having the formula:

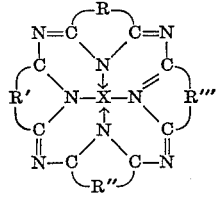

wherein R, R', R" and R''' are independently selected from the group consisting of pyridylene, phenylene, and substituted phenylene selected from the group consisting of halo substituted phenylene, sulfo substituted phenylene, chlorosulfo substituted phenylene, alkyl and aromatic substituted and unsubstituted sulfonamido substituted phenylene and X is a complex forming metal, wherein at least one of said R, R', R" and R''' is pyridylene, at least one of the remaining of said R, R', R" and R''' is a substituted phenylene as aforesaid and in all instances at least one sulfo substituted phenylene, chlorosulfo substituted phenylene or alkyl and aromatic substituted and unsubstituted sulfonamido substituted phenylene is present provided that in the instance of said sulfo and chlorosulfo substituted phenylene only one said sulfo or chlorosulfo substituted phenylene is present.

2. A mixture of compounds defined in claim 1 wherein said phenylene is present in a mole average of about 3.00 to about 3.60, said pyridylene is present in a mole average of about .40 to about .10 and said substituted phenylene is mono substituted and present in a mole average of about .70 to about .25.

3. The compound as defined in claim 1 wherein R is pyridylene, one of said R', R" and R''' is monohalosubstituted phenylene, another is alkyl substituted sulfonamido substituted phenylene and the other is phenylene.

4. The compound as defined in claim 1 wherein R is pyridylene one of said R', R" and R''' is monosulfosubstituted phenylene and the others are phenylene.

5. The compound as defined in claim 1 wherein R is pyridylene, one of said R', R" and R''' is monohalosubstituted phenylene, another is monosulfosubstituted phenylene and the remaining is phenylene.

6. The compound as defined in claim 1 wherein R is pyridylene, one of said R', R" and R''' is monosulfonamido and the others are phenylene.

7. The compound of claim 1 wherein R is pyridylene, one of said R', R" and R''' is monochlorosubstituted phenylene another is monochlorosulfo substituted phenylene and the other is phenylene.

8. The compound as defined in claim 1 wherein R is pyridylene, R' is monosulfosubstituted phenylene, R" is monochlorosubstituted phenylene and R''' is phenylene.

References Cited

UNITED STATES PATENTS

| | | |
|---|---|---|
| 2,459,771 | 1/1949 | Fox _____ 260—270 |
| 2,765,308 | 10/1956 | Campbell _____ 260—270 |
| 3,024,247 | 3/1962 | Moser and Stepp ___ 260—314.5 |
| 3,063,779 | 11/1962 | Rosch _____ 260—314.5 X |
| 3,366,641 | 1/1968 | Zwahlen _____ 260—296 |

FOREIGN PATENTS 696,590   9/1940   Germany.

OTHER REFERENCES

Yokote et al.: Chem. Abstr., vol. 55, Col. 24019, (1961).

Yokote et al.: Chem. Abstr., vol. 61, Col. 15895 (1964).

Yokote et al.: Chem. Abstr., vol. 62, Col. 14859–60 (1965).

ALEX MAZEL, Primary Examiner

D. A. DAUS, Assistant Examiner

U.S. Cl. X.R.

106—288; 260—296, 314.5, 546

UNITED STATES PATENT OFFICE
CERTIFICATE OF CORRECTION

Patent No. 3,458,517                                            July 29, 1969

James D. Stepp

It is certified that error appears in the above identified patent and that said Letters Patent are hereby corrected as shown below:

Column 4, line 61, that portion of the formula reading "$(C_5NH_3)_{0.31av4}$" should read -- $(C_5NH_3)_{0.31av.}$ --. Column 6, line 20 should read -- A range of values is: --; lines 21 to 24 should be indented; in the formula appearing in Example IX, that portion of the formula appearing at the right side reading

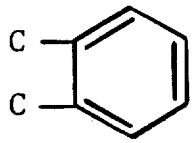      should read      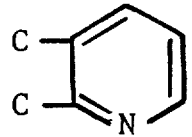

same column 6, line 69, that portion of the formula reading "$(C_6H_3SO_{22}NH)_{0.55av.}$" should read -- $(C_6H_3SO_2NH_2)_{0.55av.}$ --. Column 7, line 47, "instances" should read -- instance --; in the formula appearing in claim 1, that portion of the formula reading

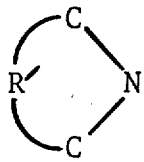      should read      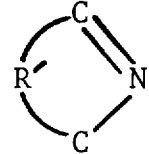

Signed and sealed this 5th day of May 1970.

(SEAL)
Attest:

EDWARD M. FLETCHER, JR.                        WILLIAM E. SCHUYLER, JR.
Attesting Officer                                     Commissioner of Patents